Feb. 2, 1937.  E. G. KESLING  2,069,526
GEAR SHIFTING MECHANISM
Filed July 20, 1935
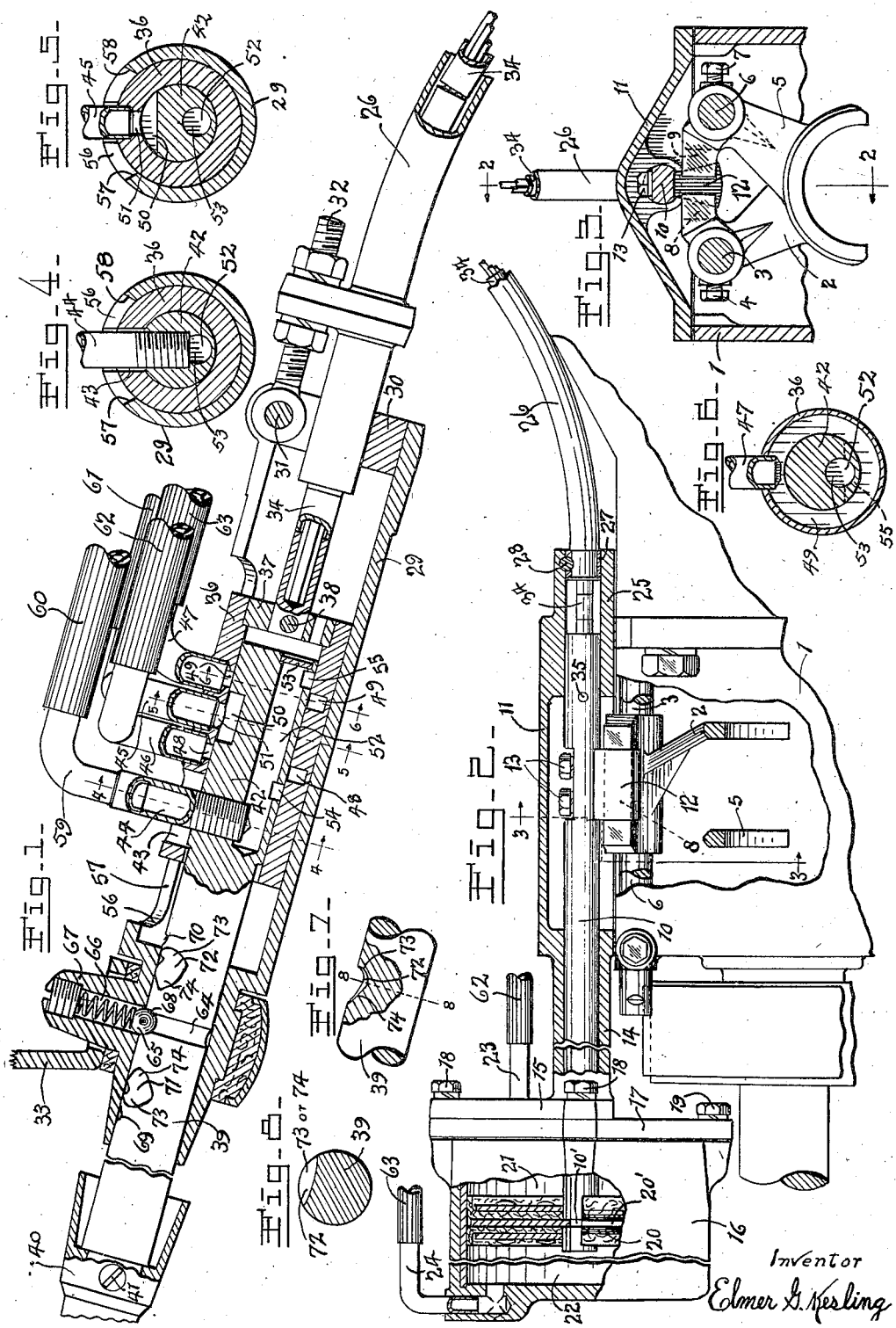
Inventor
Elmer G. Kesling Patented Feb. 2, 1937

2,069,526

UNITED STATES PATENT OFFICE 2,069,526

GEAR SHIFTING MECHANISM

Elmer G. Kesling, Bloomfield, Mo.

Application July 20, 1935, Serial No. 32,366

16 Claims. (Cl. 74—335)

This invention relates to gear shifting mechanism, and has special utility as a part of the transmission gearing of automobiles and other vehicles. The gear shifting mechanism used is of the type in which manual energy is used to effect the selecting movements and to regulate valve mechanism for controlling fluid energy utilized to effect the shifting movements, with the added feature of effecting the shifting movements by manual energy in case the fluid energy fails to affect the shifting movements or in case no fluid energy is being supplied and utilizing the same movements to effect manual shifting as in effecting the valve regulation.

The flexible shaft shown in this application is shown and claimed in my pending application Serial No. 745,507.

Objects of the invention are to provide an actuator having rotative selective movements and longitudinal shifting movements in which both the manual and power devices are directly connected to the actuator; to provide a mechanism capable of free operation and requiring a minimum of effort to effect the operation of selection and of valve control; to provide a construction and arrangement of cooperative parts whereby complete selecting and shifting operations may be manually performed, if desired; to provide mechanism wherein manual force is normally used to effect selection and valve regulation only and other means to effect the shifting movements; to provide mechanism wherein like movements of the manual operating means to effect valve regulation of a given shifting movement are made to manually effect the same shift; and to provide means for positively stopping the manual valve operating means at a predetermined point for the required fulfillment of movement to complete each of the several shifts effected by power means.

Various other objects and advantages of the invention will be made apparent from the following description, reference being made to the annexed drawing, in which—

Fig. 1 is a vertical longitudinal section of the manual control shown attached to the instrument panel of an automobile.

Fig. 2 is a view partly in section approximately on the line 2—2 of Fig. 3, and shows the application of the shifting mechanism to the transmission of an automobile.

Fig. 3 is a sectional view approximately on the line 3—3 of Fig. 2.

Fig. 4 is a sectional view on line 4—4 of Fig. 1.

Fig. 5 is a sectional view on line 5—5 of Fig. 1.

Fig. 6 is a sectional view on line 6—6 of Fig. 1.

Fig. 7 is a view partly in section of a piece of the shaft 39 showing said shaft 39 turned to the point where the stop-notch 72 is at the top of said shaft 39.

Fig. 8 is a sectional view on line 8—8 of Fig. 7.

The customary gear case 1 contains the customary selective gears, not shown. A yoke 2 for shifting the gears either into high or intermediate speeds is secured to a shift rail 3 by a bolt 4; and a yoke 5 for shifting the gears either into low or reverse speeds is secured to a shift rail 6 by a bolt 7. Notches 8 and 9 are cut in a part of the yokes 2 and 5, respectively.

The customary spring plungers and interlock are used in connection with the shift rails 3 and 6.

A spindle 10 is mounted for rocking and longitudinal movements in a gear case cover 11.

A block 12 selectively engageable with the notches 8 and 9 is secured to the spindle 10 by bolts 13 or otherwise attached thereto.

A tubular projection 14 extending from one end of the cover 11 gives bearing to the adjacent end of the spindle 10 and has an integral plate 15 formed on the extended end.

A cylinder 16 and cylinder head 17 are secured to the plate 15 by bolts 18. A bolt 19 secures the lower part of the cylinder head 17 to the cylinder 16.

The spindle 10 projects into the cylinder 16 and has a circumferential groove 10' near the end, to which a piston 20 is secured by a two pieced disk 20'. The groove 10' and the disk 20' allow the spindle 10 to turn in the piston 20, but do not permit relative longitudinal movement between the spindle 10 and the piston 20. The piston 20 divides the cylinder into chambers 21 and 22.

A tube 23 is secured in a wall of the cylinder 16 and communicates with the chamber 21. A tube 24 is secured in a wall of the cylinder 16 and communicates with the chamber 22. The cylinder 1? may be placed any desirable distance from the gear case, and if need be can be additionally supported by any convenient stationary part of the automobile.

A tubular projection 25 extends from the other end of the cover 11 and gives bearing to the adjacent end of the spindle 10.

One end of a curved tube 26 is secured in the end of the projection 25 by a tubular block 27 and a bolt 28. The other end of the curved tube 26 is adjustably secured to a supporting member 29 by an open-walled tubular block 30 and the bolts 31 and 32. The supporting member 29 is secured to the instrument panel 33 by bolts not shown.

A flexible shaft 34 is supported and guided in the curved tube 26. One end of the flexible shaft 34 is secured in an axial bore in the end of the spindle 10 by a pin 35. The other end of the flexible shaft 34 is secured to one end of a tubular valve chest 36 by a washer 37 and a pin 38.

The valve chest 36 is mounted for rocking and longitudinal movements in the supporting member 29.

An operating shaft 39 is mounted for rocking and longitudinal movements in one end of the member 29. One end of the operating shaft 39 projects beyond the end of the member 29 and an operating handle 40 is secured thereto by a screw 41. The other end of the operating shaft 39 is made integral with a valve member 42 which is mounted in the valve chest 36 for limited longitudinal movements by use of a slot 43 in the wall of the valve chest 36 and a threaded tube 44 which is screwed into a threaded hole in the side of the valve member 42 and extends through the slot 43, the slot 43 being substantially equal in width to the diameter of the tube 44.

One end of tubes 45, 46 and 47 is soldered or otherwise secured in the wall of the valve chest 36 and in longitudinal alignment with the slot 43.

Circumferential grooves 48 and 49 are provided in the inner wall of the valve chest 36 and communicate with the tubes 46 and 47, respectively. The grooves 48 and 49 are ports and will hereinafter be referred to as port 48 and port 49, respectively.

A notch in the side of the valve member 42 forms the intake valve 50 which communicates with the tube 45 by a hole 51 through the adjacent wall of the valve chest 36.

A hole 52 is bored in the free end of the valve member 42 and is closed at the end by a disk 53 by solder or otherwise.

A slot in the wall of the hole 52 forms an exhaust valve 54 which may be made to communicate with the port 48, and a slot in the wall of the hole 52 forms an exhaust valve 55 which may be made to communicate with the port 49. The tube 44 extends into the hole 52.

The tubes 44, 45, 46, and 47 all extend through a substantially wide slot 56 through the wall of the supporting member 29. The slot 56 limits the extent of rocking movements of the operating parts 36, 39, 40, etc. by a side of the tube 44 encountering one or the other of the side walls 57 or 58 of the slot 56. It is noted that the tube 44 has a larger diameter than the tubes 45, 46, and 47.

One end of a tube 59 is secured by solder or otherwise into the projecting end of the tube 44. The other end of the tube 59 is connected to an air cleaner, not shown, by a rubber tube 60. The air cleaner connected with may be the one customarily used in connection with the carburetor of the automobile.

The projecting end of the tube 45 is connected to the exhaust manifold, not shown, of the automobile, by a rubber tube 61.

The projecting ends of the tubes 23 and 46 are connected by a rubber tube 62, and the projecting ends of the tubes 24 and 47 are connected by a rubber tube 63. It is understood that these tubes 60 to 63, inclusive, may be made of any other air tight flexible material.

A neutral groove 64 is provided on the operating shaft 39 for engagement of a spring pressed ball 65 which is mounted in a hole 66 in a projection 67 formed on the member 29. The groove 64 is cut deeper at the proper point to form a neutral lock 68 for locking the operating shaft 39 against longitudinal movements from neutral position while positioned approximately in the center of its arc of rotation.

Stop-notches 69, 70, 71, and 72 are properly placed on the operating shaft 39 which notches are engaged by the ball 65 to stop the movement of the operating shaft 39 at the proper point for the complete fulfillment of the power shifting movements into reverse, low, intermediate and high speed positions, respectively. These stop-notches have an abrupt wall 73 which is located on the side away from the neutral groove 64, and a sloping wall 74 which is on the side toward the groove 64.

It is obvious that none of these notches 69, 70, 71 or 72 can be moved past the ball 65, because the notch is deep enough that the ball 65 will not raise out of it over the abrupt wall 73; and it is plain to be seen that the notch can be moved from the ball 65 in the opposite direction, that is away from the wall 73, because the ball 65 will raise over the sloping wall 74.

In the operation of the device, the operating handle 40 is turned until a side of the tube 44 encounters a side wall 57 or 58 of the slot 56 which turned position is the fully selected position. This turning movement, if made in neutral position, unlocks the ball 65 from the neutral lock 68 and places the notches 69—70 or 71—72, as the case may be, in longitudinal alignment with the ball 65; and, through the flexible shaft 34, turns the actuating spindle 10 and block 12 to engage the block 12 in one or the other of the notches 8 or 9 and entirely free from the notch 8 or 9 not engaged. After which position, longitudinal movement of the parts will effect shifting of the selected gear.

Therefore, in making a shift into reverse speed by power means, starting from neutral position, which is the position shown in the drawing selection is made by manually turning the handle 40 clockwise to fully selected position. This turning movement will disengage the neutral lock 68 from the ball 65 and places the stop-notch 69 in longitudinal alignment with the ball 65 and, through the flexible shaft 34 and connected parts, turns the spindle 10 and causes the block 12 to engage the notch 9 and entirely free itself from the notch 8, after which the handle 40 and shaft 39 is moved inwardly whereupon the intake valve 50 will communicate with the port 49 and the exhaust valve 54 with the port 48 and vacuum energy through the hole 51 and tube 45—61 will deplete the air from the chamber 22 through the tube 24—63—47, while atmospheric air will rush into chamber 21 through tube 60—59—44, hole 52, valve 54, port 48 and tube 46—62—23 and push the piston 20 to the left, as shown in Fig. 2, to effect reverse speed position through the longitudinal movement of the spindle 10, block 12, notch 9 and yoke 5, which movement will also move shaft 34 and valve chest 36 together with ports 48 and 49 in the same direction. The inward movement of the shaft 39 etc. will be continued until the wall 73 of the stop-notch 69 engages the ball 65, and the piston 20, spindle 10 etc. will continue to move until the port 49 overruns the valve 50 and completely fulfills the movement to shift into reverse speed position.

To make the shift from reverse speed position to low speed position, the handle 40 etc. are kept turned clockwise to fully selected position, since the selected position for shifting into low is the same as for reverse, and pulled outwardly which movement will cause the intake valve 50 to communicate with the port 48 and the exhaust valve 55 with the port 49 and vacuum energy through the hole 51 and tube 45—61 will deplete the air from the chamber 21 through tube 23—62—46, while atmospheric air will rush into chamber 21 through tube 60—59—44, hole 52, valve 55, port 49 and tube 47—63—24 and push the piston to the right, as shown in Fig. 2, to effect low speed position through the longitudinal movement of the spindle 10, block 12, notch 9 and yoke 5, which movement will also move shaft 34, and valve chest 36 together with ports 48 and 49 in the same direction. The outward movement of the operating shaft 39 etc. will be continued until the wall 73 of the stop-notch 70 engages the ball 65, and the piston 20, spindle 10 etc. will continue to move until the port 48 overruns the valve 50 and the movement to shift into low speed position is completely fulfilled.

It can here be noted that the operating handle 40, shaft 39 and valve chest 36 turn through a greater number of degrees than the spindle 10 and block 12 in effecting a fully selected position. This is on account of the torsional resiliency of the flexible shaft 34. The extra amount of turn given the operating end is sufficient for the transmission of the required turning force to the operated end. On account of this torsional resiliency in the flexible shaft 34, the handle 40 etc. may be turned to the full arc of rotation or the fully selected position in either direction at any time.

If the parts are not already in neutral position and the handle 40 is turned to a selection different from that already made, the selection will be completed in the gear case 1 by the torsional resistance of the shaft 34 as soon as the parts are moved to neutral position.

It will also be noted that in case a selection has been made and a shift effected or partly effected and the manual turning force is relieved from the handle 40, the resilient action of the shaft 34 will return the handle 40 a distance toward the center of its arc of rotation, in which case, if the parts are brought to neutral position, the neutral lock 68 will engage the ball 65 and positively stop the parts in neutral position, because the notch forming the neutral lock 68 is deep enough and long enough to always lock the parts against movements from neutral position unless the handle 40 is manually turned.

To make the shift from reverse or low speed position to intermediate or high speed position, the parts are brought to neutral position by pushing or pulling the handle 40 etc., as the case may be, whereupon the vacuum and atmospheric air will make the same passages as were recited in effecting reverse speed position when returning from low speed position, and as were recited in effecting low speed position when returning to neutral from reverse speed position. In these movements, if the handle 40 has been turned anti-clockwise to effect selection for shifting into intermediate or high speed position, the resiliency of the shaft 34 will turn the spindle 10 etc. and complete the selection as soon as neutral position has been attained. But, if the parts have been brought to neutral position without any manual turning force having been applied to the handle 40, the neutral lock 68 will have operated to stop the parts at neutral position, and then, if turning force is applied to the handle 40 in anti-clockwise direction to effect selection for shifting into intermediate or high speed position, the parts 39, 36 etc. will turn to cause the block 12 to move into the notch 8 and be entirely free from the notch 9, whereupon the handle 40 etc. may be pushed inwardly and the same valve action and air passings to effect the shift into intermediate speed position will take place as were recited to effect shifting into reverse speed position; or, if the handle 40 etc. were pulled outwardly, the same valve action and air passings to effect the shift into high speed position will take place as were recited to effect shifting into low speed position.

Of course, it is understood that the movements of the shaft 39 etc. are properly stopped by the notches 71 or 72 when making the shift into intermediate or high speed positions, respectively.

The stop-notches 69, 70, 71, and 72 are all made circumferentially long enough to always stop the shaft 39 etc. regardless as to whether the selective turning force is applied to the handle 40 or not.

It can here be noted that a function of the notches 69, 70, 71, and 72 is to positively limit the longitudinal valve regulating movements of the shaft 39 and valve member 42 for effecting power shifting into the respective selected speeds. It is obvious that such limiting notches are necessary for proper restricting of the valve regulating movements; because, if no such limiting notches were provided, a slight over movement of the valve member 42 would either cause the selected gear to be moved too far or result in a continued pressure of the yoke 2 or 5, as the case may be, against the respective gear, since the vacuum energy would not be cut off at the proper point of movement. Therefore, it is clearly seen that the stop notches 69, 70, 71, and 72 are a dependant and cooperative part of the shifting mechanism.

The shifting may be made into the different speed positions by manual force only, in case the power means fails to work or in case no power energy is being supplied. In this connection, selection is effected in the same manner as was recited for power shifting; but the shifting is effected by manual force being applied by the operator to the handle 40 which force moves the shaft 39 and valve member 42 longitudinally in the direction desired and the tube 44 engages one end or the other of the slot 43 and the parts 36, 34, 10, and 12 are moved longitudinally in the same direction to effect the shift selected. Of course, it will be noted that the piston 20 during these manual shifting movements is moved with the longitudinal movements of the spindle 10.

It is obvious also that in case the power energy is insufficient to effect a shift or any part of a shift, manual force may be applied to the handle 40 to aid in effecting such shift.

It is further to be noted that any movement, including those being effected by power energy, may be stopped or reversed by simply stopping or reversing the movement of the handle 40 etc.

It is obvious that the manual and power means of this invention is applicable to any shifting mechanism having a single actuator that is mounted for rotative selective movements and longitudinal shifting movements.

I do not restrict myself in any unessential respects, but what I claim and desire to secure by Letters Patent is:

1. Gear shifting mechanism of the character described comprising shifter elements, an actuator spindle mounted for rocking and longitudinal movements, means secured to said spindle for selectively engaging said elements respectively by rocking movements of said spindle and for shifting the selected element by longitudinal movements of said spindle, manual means directly attached to one end of said spindle for selectively rotating said spindle, power means directly attached to the other end of said spindle for imparting shifting movements to said spindle, and means associated with said manual means to control said power means.

2. Gear shifting mechanism of the character described comprising shifter elements, an actuator mounted for rotative movements to selectively engage either of said elements and for longitudinal movements to shift the element selected, manual means directly attached to one end of said actuator to rotate said actuator, power means directly attached to the other end of said actuator to move said actuator longitudinally, and means associated with said manual means for controlling said power means.

3. Gear shifting mechanism of the character described comprising shifter elements, an actuator for selectively shifting said elements respectively, power means directly attached to said actuator for imparting shifting movements to said actuator, manual means directly attached to said actuator for selectively moving said actuator by rotative movements of said manual means, and valve controlling means for said power means associated with said manual means and regulated by longitudinal movements of said manual means.

4. Gear shifting mechanism of the character described comprising shifter elements, an actuator engageable to selectively shift said elements respectively, power means connected to said actuator for imparting shifting movements to said actuator, controlling means for said power means, a support, and manual operating means connected to said actuator and to said controlling means and mounted on said support for rotative movements to selectively engage said actuator and for longitudinal movements to regulate said controlling means.

5. Gear shifting mechanism of the character described comprising shifter elements, an actuator engageable to selectively shift said elements respectively, power means connected to said actuator for imparting shifting movements to said actuator, controlling means for said power means, a support, manual operating means connected to said actuator and to said controlling means and mounted on said support for rotative movements to selectively engage said actuator and for longitudinal movements to regulate said controlling means, and means associated with said support and said operating means for positively stopping said longitudinal movements of said operating means at a predetermined point.

6. Gear shifting mechanism of the character described comprising selective shifter elements, a power means selectively engageable for shifting said elements respectively, valve means for controlling said power means, a control shaft connected to said power means and to said valve means, and manual means connected to said control shaft for rotating said shaft to selectively connect said power means with one of said elements and for imparting longitudinal movements to said shaft to regulate said valve means to control said power means to shift the element selected.

7. Gear shifting mechanism of the character described comprising selective shifter elements, a power means selectively engageable for shifting said elements respectively, valve means for controlling said power means, a control shaft connected to said power means and to said valve means, manual means connected to said control shaft for rotating said shaft to selectively connect said power means with one of said elements and for imparting longitudinal movements to said shaft to regulate said valve means, and means associated with said shaft for limiting said longitudinal movements of said shaft.

8. Gear shifting mechanism of the character described comprising shifter elements, a power device for shifting said elements, a control valve for said power device, a support, manual operating means movable longitudinally in said support for regulating said control valve, a ball mounted in said support, and a notch in said operating means for engaging said ball to positively limit said longitudinal movement of said operating means in that direction.

9. Gear shifting mechanism of the character described comprising shifter elements, power means for shifting said elements, control means for said power means, a support, operating means movable longitudinally in said support for regulating said control means including a resilient means, and means associated with said support and said operating means cooperatively acting to positively limit longitudinal movement of said operating means in that direction.

10. Gear shifting mechanism of the character described comprising shifter elements, an actuator engageable to selectively shift said elements respectively, power means for imparting shifting movements to said actuator, a port communicating with said power means and movable with said actuator, manual means operatively connected with said actuator and having relatively longitudinal movement therewith and rotatable to selectively engage said actuator with one of said elements, and a valve associated with said manual means movable longitudinally therewith to control passage of fluid energy through said port, whereupon said fluid operates said power means.

11. Gear shifting mechanism of the character described comprising a shifter element, a power device connected to said element for shifting said element, a valve for controlling said power device, a support, a manual operating means connected to said power device and to said valve movable longitudinally in said support for regulating said valve and for manually operating said device in case said valve fails to control said device.

12. Gear shifting mechanism of the character described comprising a shifter element, a power device connected to said element, a valve for controlling said power device, a support, an operating shaft connected to said valve and to said element and mounted in said support for longitudinal movements, a notch including an abrupt wall and a sloping wall formed in said shaft, and means on said support for engaging said notch and said abrupt wall to positively limit said longitudinal movement of said shaft in one direction, said means being disengageable from said notch during return longitudinal movement of said shaft by riding over said sloping wall.

13. Gear shifting mechanism of the character described comprising a shifter element, power means connected to said element, a valve for controlling said power means, a supporting device, an operating device connected to said valve and to said element and mounted in said supporting device for longitudinal movements, an engaging means mounted on one of said devices, and notches formed on the other one of said devices with each of said notches having an abrupt wall for engagement of said engaging means to positively limit said longitudinal movements of said second device in that direction and a sloping wall over which said engaging means rides upon return movement of said second device.

14. Gear shifting mechanism of the character described comprising a shifter element, power means connected to said element, a valve for controlling said power means, a support, an operating device connected to said valve and to said element and mounted on said support for longitudinal movements, spaced notches including an abrupt wall for each notch formed on said shaft, and means mounted on said support and located between said notches for positive engagement by either of said notches and the respective abrupt wall to restrict said longitudinal movements of said shaft.

15. Gear shifting mechanism of the character described comprising a shifter element, power means connected to said element, a valve for controlling said power means, a supporting device, an operating device connected to said valve and to said element and mounted on said supporting device for longitudinal movements, spaced stop notches formed on one of said devices, and an engaging means mounted on the other one of said devices and located between said notches for positive engagement by either of said notches to restrict said longitudinal movements of said second device.

16. Gear shifting mechanism of the character described comprising a shifter element, power means connected to said element for shifting said element, a control valve for said power means, and an operating device connected to said valve and to said element and mounted for longitudinal movements for regulating said valve and also for assisting said power means to shift said shifter element.

ELMER G. KESLING.